June 30, 1959 L. A. ULE 2,892,945

FOLLOW-UP SYSTEM

Filed Sept. 9, 1957 2 Sheets-Sheet 1

LOUIS A. ULE
INVENTOR.

BY

ATTORNEY

June 30, 1959

L. A. ULE 2,892,945

FOLLOW-UP SYSTEM

Filed Sept. 9, 1957

2 Sheets-Sheet 2

LOUIS A. ULE
INVENTOR.

BY [signature]
ATTORNEY 2,892,945

FOLLOW-UP SYSTEM

Louis A. Ule, Alhambra, Calif., assignor to Gilfillan Bros., Inc., Los Angeles, Calif., a corporation of California Application September 9, 1957, Serial No. 682,886
11 Claims. (Cl. 331—17)

This invention relates to servo mechanisms wherein a controlled variable magnitude is corrected to that of a reference signal by introducing a correction or error signal proportional to the difference in magnitudes of the variable and reference signal to a control servo, and more particularly to a device responsive to sense ambiguous error signals for determining whether the controlled variable need be increased or decreased to reduce the error between the variable and reference signal magnitudes to zero.

The invention may have a number of applications; however, it has been found particularly useful in automatic frequency control (AFC) systems. It is common to employ an oscillator in such systems mechanically tunable by a servo motor. The output of the oscillator is then mixed with the output signal of a reference signal source. The output of the mixer will be alternating current signals having frequencies equal to the sum and difference of the frequencies of the oscillator output signal and of the reference source output signal. The lower or difference frequency output signal will then be a measure of the frequency error of the oscillator output signal; however, it is impossible to determine whether the oscillator output signal frequency is greater or less than that of the reference signal. For this reason, a reference signal of an offset frequency has been used in the past. Alternatively, the reference signal is frequency modulated.

Both of these prior art systems have disadvantages. Firstly, in the case that an offset reference signal frequency is used, the tuning range of the system is restricted to the offset that is employed. In AFC systems utilizing frequency modulated reference signals, it is impossible to set the frequency of the oscillator output signal to the same as that of the reference signal accurately because the reference signal frequency changes continuously.

It is therefore an object of the invention to provide means for determining the sense of an error signal in a follow-up system.

It is another object of the invention to provide means to determine the algebraic sign of an error signal in a follow-up system in which a sense-ambiguous error signal is produced.

Still another object of the invention is to provide an accurate automatic frequency control system unlimited as to tuning range.

The present invention therefore is used in connection with a follow-up system including a servo and utilization device producing an output signal, for example $c$, and means for producing a reference signal, for example $r$. The invention thus comprises means for producing an error signal, for example $e$, proportional to $|c-r|$, where the vertical lines indicate the absolute value of the difference between the output and reference signals. $c$ and $r$ may be alternating voltages having, respectively, the output and standard frequencies in an AFC system. The symbol $e$ may therefore be an alternating voltage having a frequency equal to the difference between the frequencies $c$ and $r$. Means are also provided for producing a signal $$\frac{de}{dt}$$

which is the derivative of the error signal with respect to time. Means are additionally provided to produce the derivative of the output signal with respect to time or $$\frac{dc}{dt}$$

Lastly, means are provided for introducing a control signal to the servo and utilization device to reduce $c$ when the algebraic signs of each of the derivatives of the same and to increase $c$ when the signs of the derivatives are different. Detailed proof of the mode of operation of the system of the invention together with a simple logical proof of its working mechanism is set out in detail hereinafter.

These and other objects and advantages of the present invention will be better understood when considered with the following description taken in connection with the accompanying drawings made a part of this specification, wherein several embodiments are illustrated by way of example. The device of the present invention is by no means limited to the specific embodiments illustrated in the drawings since they are shown merely for purposes of description.

The theory of operation of the invention will be better understood in connection with the following brief mathematical proof. An error signal lacking sense information can be described as follows:

$$e=|c-r| \quad (1)$$

where $e$ is the error signal which is always positive regardless of the sense of the actual error, the vertical bars being the conventional mathematical symbols employing the absolute value of the numbers they embrace as stated previously. In Equation 1, $c$ is the control variable or output of the control system and $r$ is the reference variable or input. Since $e$ and $r$ are functions of time, the first derivative can be obtained by means of a differentiating network or amplifier as explained previously. Assuming $r$ is not to vary, the derivative of $e$ with respect to time may be expressed as follows:

$$\frac{de}{dt}=+\left|\frac{dc}{dt}\right| \quad (2)$$

if either (*a*)

$$\frac{dc}{dt}$$

is positive and $c$ is greater than $r$, or (*b*)

$$\frac{dc}{dt}$$

is negative and $c$ is less than $r$. The derivative of $$\frac{de}{dt}$$

may again be expressed as follows:

$$\frac{de}{dt}=-\left|\frac{dc}{dt}\right| \quad (3)$$

if either (*c*)

$$\frac{dc}{dt}$$

is positive and $c$ is less than $r$, or (*d*)

$$\frac{dc}{dt}$$

is negative and $c$ is greater than $r$.

From the statements (*a*), (*b*), (*c*) and (*d*), it may be concluded that if the derivatives of $e$ and $c$ are of the same sign, then $c$ is greater than $r$. Conversely, when the derivatives of $e$ and $c$ are of an opposite sign, then $c$ is less than $r$.

Figure 1:
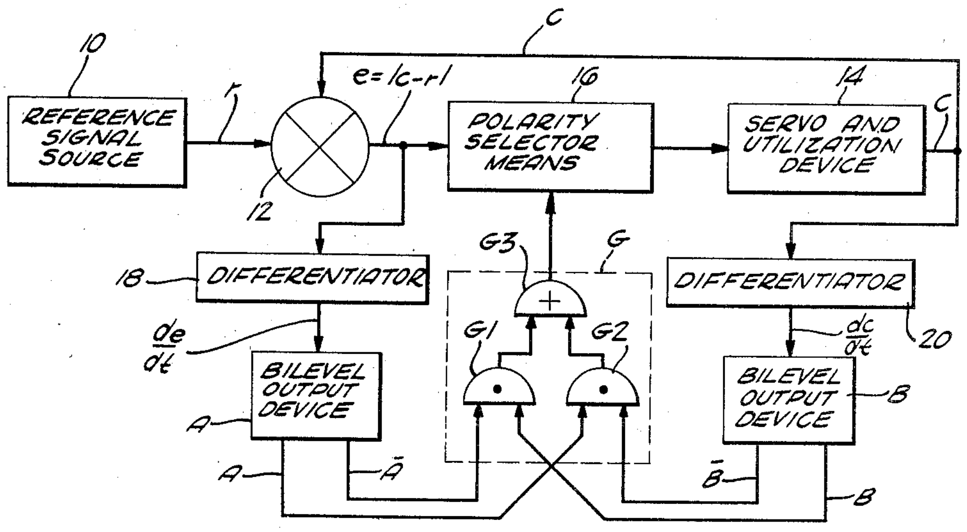
Fig. 1 is a block diagram of one embodiment of the invention.
Figure 3:
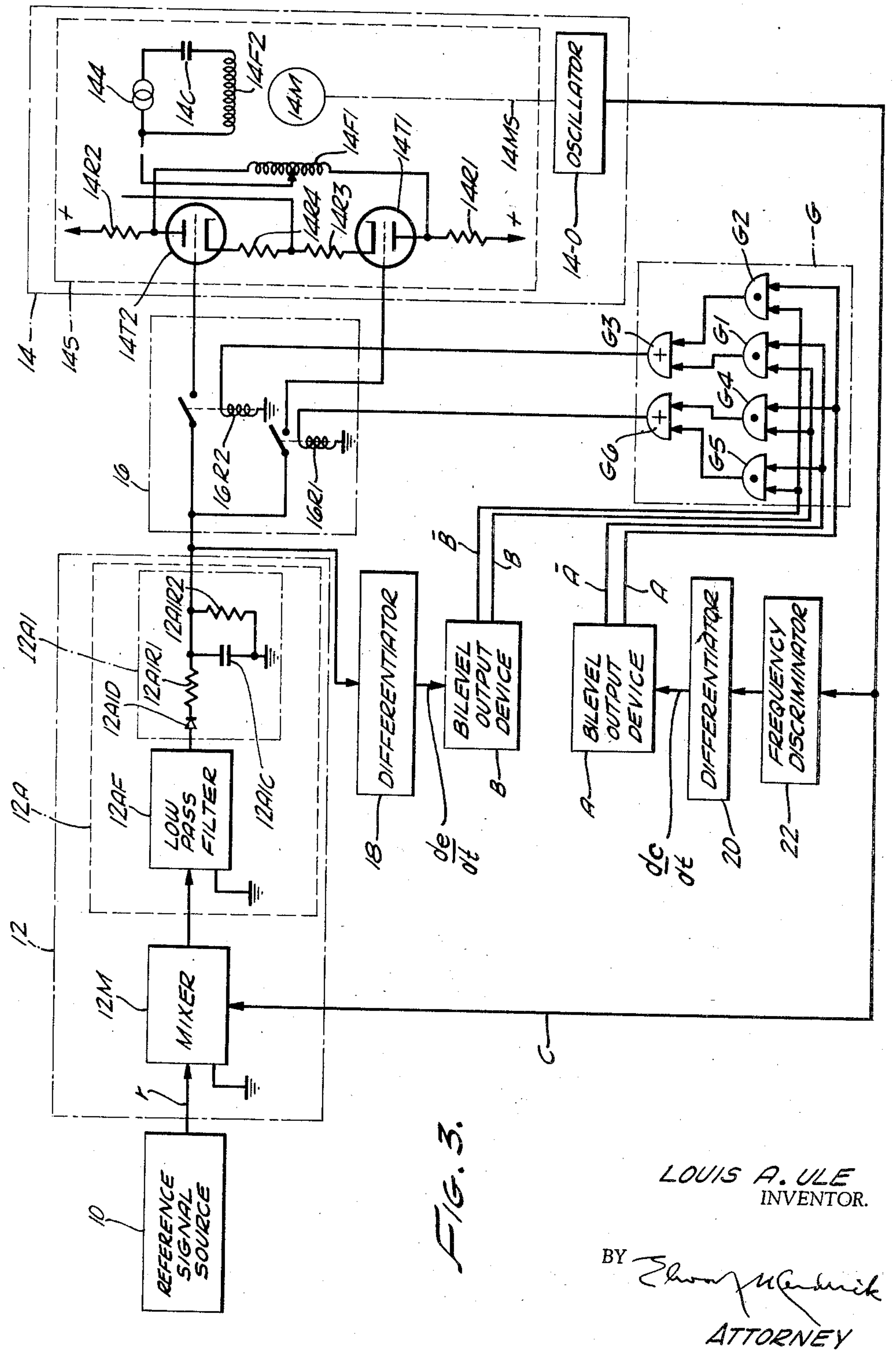
Fig. 3 is a partial block and partial schematic diagram of still another embodiment of the invention.

As explained previously, the logic of this arrangement can be easily set up in logical "and" circuits and logical "or" circuits, arrangements for gating circuits G being illustrated both in Figs. 1 and 3.

In Fig. 1, a reference signal source 10 is shown having an output $r$ impressed upon a subtracter 12 having an input $c$ from a servo and utilization device 14 and an output $e$ which is impressed upon polarity selector means 16 and a differentiator 18. The output of servo and utilization device 14 or $c$ is also impressed upon a differentiator 20. Differentiators 18 and 20 produce signals $$\frac{de}{dt} \text{ and } \frac{dc}{dt}$$

each of which are impressed upon corresponding bilevel output devices A and B. Bilevel output device produces a high level output signal A when $$\frac{de}{dt}$$

is positive and a low level signal A when $$\frac{de}{dt}$$

is negative. Conversely a low level signal $\bar{A}$ is produced when $$\frac{de}{dt}$$

is positive and a high level signal $\bar{A}$ is produced when $$\frac{de}{dt}$$

is negative. Similarly, B is high and $\bar{B}$ is low at the output of device B when $$\frac{dc}{dt}$$

is positive and B is low and $\bar{B}$ is high when $$\frac{dc}{dt}$$

is negative. A gating circuit G responsive to the signals A, $\bar{A}$, B, and $\bar{B}$ is then employed to produce an output signal which is impressed upon polarity selector means 16. An output signal is produced with a particular gating circuit G shown when the outputs of bilevel output devices A and B are different, i.e. when A is high and B is low or B is high and A is low. Polarity selector means 16 simply reverses the polarity of $e$, if necessary, or passes it directly to servo and utilization device 14 depending upon the polarity necessary to correct any deviation of $c$ from the reference signal $r$.

Circuits indicated in the blocks of the diagram in Fig. 1 may be mechanized in a manner such that the input to servo and utilization device 14 is actually the derivative of $c$. In this case, servo and utilization device 14 is simply an integrator, for example a motor, a hydraulic valve, or the like. In fact, all the component parts of the embodiment of the invention shown in Fig. 1 may be conventional. Reference signal source may be any voltage source. Subtracter 12 may be a mixer or other simple analog subtracter, e.g. for alternating current signals. Polarity selector means may simply be an electronic or a relay gate. As stated previously, servo and utilization device 14 may be a motor or hydraulic valve or the like. Differentiators 18 and 20 maybe conventional and are well known in the art. Bilevel output devices A and B are also well known in electronic digital computing art.

Figure 2:
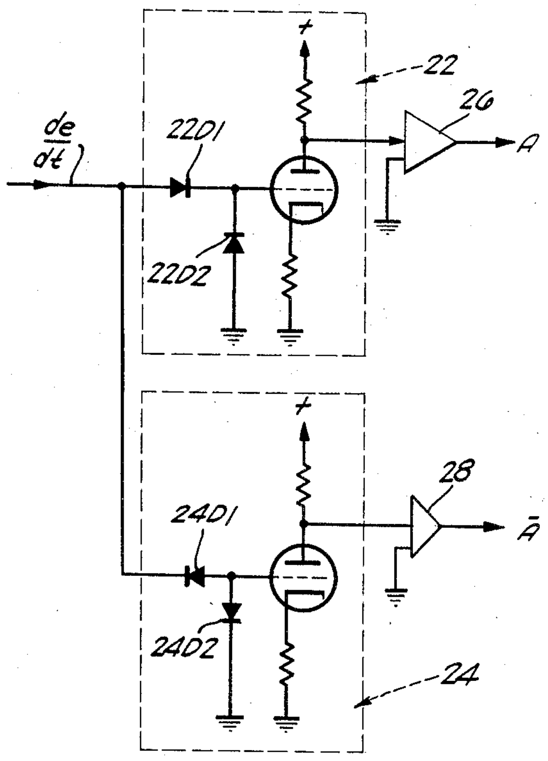
Fig. 2 is a schematic diagram of a bilevel output device indicated in two blocks in Fig. 1.

Bilevel output device A is shown in Fig. 2. Bilevel output device B may be identical. Alternatively, both bilevel output devices may be Schmidt trigger circuits which are well known in the art. In Fig. 2 a $$\frac{de}{dt}$$

input is shown provided to amplifiers 22 and 24 having input diodes 22D1 and 22D2 and 24D1 and 24D2, respectively. Diode 22D1 provides a low series input impedance and 22D2 presents a high parallel input impedance to a positive incoming signal. The converse is true of diodes 24D for a negative incoming signa. Devices indicated at 26 and 28 are high gain amplifiers which produce a high level output signal for any positive or negative input signal $$\frac{de}{dt}$$

respectively. It is to be noted that where low level input signals are involved, the gating input signal to polarity selector means 16 is unimportant since the magnitude of error signal $e$ will be very small. Hence, the device of the invention is accurate in an operating range which is the most important.

Gating circuit G includes two "and" gates G1 and G2 and an "or" gate G3. The "and" gates G1 and G2 produce high level output signals whenever the output of bilevel devices are different. "Or" gate G3 simply produces a high output signal whenever the outputs of "and" gates G1 and G2 are high. For a basic discussion of logical "and" gates and logical "or" gates, see pages 37 through 45 inclusive of "High-Speed Computing Devices," authored by the staff of Engineering Research Associates, Inc., (McGraw-Hill, 1950).

Those only briefly skilled in the electronic digital computing art will realize that the gating circuit G may be mechanized in several different ways, for example, according to the Boolean algebra of the following four equations:

$$G = A\bar{B} + \bar{A}B \tag{4}$$

$$G = AB + \bar{A}\bar{B} \tag{5}$$

$$G = (A+B)(\bar{A}+\bar{B}) \tag{6}$$

$$G = (A+\bar{B})(\bar{A}+B) \tag{7}$$

It is to be noted that the mechanization according to Equation 4 is in fact represented by the gating circuit G shown in Fig. 1. In each of the four equations above G represents the output of gating circuit G. For the particular mechanization of Fig. 1, it is to be noted that polarity selector means 16 must be biased ordinarily to pass an output signal of a polarity in magnitude proportional to the difference between $r$ and $c$ represented by a condition of $c$ being greater than $r$. Thus, when $$\frac{de}{dt} \text{ and } \frac{dc}{dt}$$

becomes opposite in sign, the condition of $c<r$ will be taken care of by production of an output signal at gating circuit G which is impressed upon polarity selector means 16 to change the polarity of the output signal impressed upon servo and utilization device 14.

Alternatively, if gating circuit G were mechanized in accordance with Equation 5 above, polarity selector means 16 would have to be normally biased to produce an output signal $e$ corresponding to a condition of $c<r$. Thus an output signal from gating circuit G would be produced when $$\frac{de}{dt} \text{ and } \frac{dc}{dt}$$

are both the same size indicating the condition $c>r$. In this case the polarity at the output of polarity selector means 16 would be reversed.

Those skilled in the art will readily recognize the mechanization corresponding to Equations 6 and 7 are generally not done but are practicable. This mechanization of course involves the use of two "or" gates feeding a single "and" gate.

In Fig. 3, reference signal source 10 is shown with combining means 12, polarity selection means 16 and servo and utilization device 14. Differentiators 18 and 20, bilevel output devices A and B, and a frequency discriminator 22 is also shown.

In this specific embodiment of the invention, combining means 12 includes a mixer 12M and an analog device 12A for producing an analog output signal proportional to the difference frequency output of mixer 12M. In this particular case, the embodiment of the invention is used as an AFC or automatic frequency control circuit for an oscillator 14–O shown in servo and utilization device 14. The output of the oscillator 14–O is therefore an alternating voltage. For this reason, reference signal source 10 also produces an alternating voltage of a desired frequency. These two signals still indicated at $r$ and $c$, respectively, are mixed in mixer 12M. Circuit 12A includes a low pass filter 12AF for passing only a signal of a frequency equal to the difference between the output signal frequencies of oscillator 14–O and reference signal source $r$, or $c$ and $r$ respectively.

An integrator circuit 12AI is also provided in circuit 12A. Circuit 12AI simply includes a half wave rectifier 12AID connected serially with an integrating circuit including a resistor 12AIR1 and a capacitor 12AIC. An output load resistor 12AI2 is connected in parallel with capacitor 12AIC. Thus the output of combining means 12 will be a D.C. voltage proportional in amplitude to the quantity $e=|c-r|$, i.e. the absolute value of the difference between $c$ and $r$.

This signal is impressed upon differentiator 18 as before and upon polarity selection means 16 as before. In this particular case polarity selection means includes simply two relays 16R1 and 16R2 to pass the same output signal to a servo 14S in servo and utilization device 14 depending upon the output logic of the gating circuit G. Alternatively, either a triode 14T1 is connected to the output of combining means 12 or the control grid of a triode 14T2 is connected to the output of combining means 12 by polarity selection means 16. Servo 14S is conventional and includes anode resistors 14R1 and 14R2 for triodes 14T1 and 14T2, respectively, and cathode resistors 14R3 and 14R4 for these same two. Field windings 14F1 and 14F2 are then provided for a motor 14M, an alternating source 14A being provided to excite both windings 14F. The current in winding 14F2 is maintained a certain amount out of phase with that in winding 14F1 by a capacitor 14C. Thus motor 14M is a split phase motor. A direction of movement of its output shaft 14MS to tune oscillator 14–O is determined by which tube 14T receives the output signal of combining means 12. Source 14A is connected between the mutual junction resistors 14R3 and 14R4 and the center tap of field winding 14F1 as is conventional. The logic of gating circuit G is multiplied from that shown in Fig. 1 to include "and" gates G4 and G5 and an "or" gate G6 to energize relay 16R1 when the signs of the $$\frac{de}{dt} \text{ and } \frac{dc}{dt}$$

are the same. Conversely relay 16R2 is energized when the signs of the $$\frac{de}{dt} \text{ and } \frac{dc}{dt}$$

are different.

Thus, the frequency of the output signal of oscillator 14–O will be decreased when relay 16R1 is energized and will be increased when relay 16R2 is energized. The correction of the frequency of oscillator 14–O will be made by means of servo 14S. In the first instance, when the oscillation frequency of oscillator 14–O is decreased, the oscillation frequency of oscillator 14–O will be decreased until the frequency of oscillator 14–O becomes equal to the output signal frequency of reference signal source 10. When this condition occurs, relay 16R1 will generally be de-energized. Similarly, servo 14S will continue to increase the oscillation frequency of oscillator 14–O until the oscillation frequency $c$ of the output signal of oscillator 14–O becomes equal to the frequency $r$ of the output signal of reference signal source 10. Again when the frequencies $r$ and $c$ become equal, relay 16R2 will generally be de-energized. At any rate, when the frequency $c$ becomes equal to the frequency $r$, whether $c$ is increasing or decreasing, the output of combining means will be zero. It will, therefore, in this case be impossible to drive motor 14M since no input signal will be provided on the output lead of combining means 12.

It is to be noted that if the system of Fig. 1 is used, an input error signal always being provided to servo and utilization device 14, if the motor 14M which may be used therein is adjusted to drive, for example, oscillator 14–O shown in Fig. 4 at an appropriate speed detectable by differentiators 18 and 20, it will generally be impossible for any ambiguity to arise when the error signal is of an amplitude sufficient to cause feedback. It is to be noted that in effect circuit 12AI is a low pass filter and the additional low pass filter 12AF may be eliminated.

As explained previously, the invention will have a considerable number of applications. Furthermore, many changes and modifications of the invention may be made including changes in gating circuit G and the logic thereof and in the specific embodiment shown in any of the other blocks of Fig. 1 without departing from the true scope of the invention as defined in the appended claims.

What is claimed is:

1. In a follow-up system including a servo and utilization device producing an output signal $c$, and means for producing a reference signal $r$, the combination comprising: means for producting an error signal $e$ proportional to $|c-r|$; means for producing a signal $$\frac{de}{dt}$$

proportional to the rate of change of said error signal; means for producing a signal $$\frac{dc}{dt}$$

proportional to the rate of change of said output signal; and means responsive to said $$\frac{de}{dt} \text{ and } \frac{dc}{dt}$$

signals for introducing a correction signal to said servo and utilization device of one polarity when the algebraic signs of said $$\frac{de}{dt} \text{ and } \frac{dc}{dt}$$

signals are the same and of an opposite polarity when the algebraic signs of said $$\frac{de}{dt} \text{ and } \frac{dc}{dt}$$

signals are different.

2. A follow-up system comprising: a servo and utilization device producing an output signal $c$; a reference signal source for producing a reference signal $r$; means for producing an error signal $e$ proportional to the quantity $|c-r|$; a first differentiator for producing an output signal proportional to the derivative of said error signal with respect to them; a first bilevel output device for producing bilevel signals corresponding to the algebraic sign of said error signal derivative; a second differentiator for producing a signal proportional to the derivative of said output signal; a second bilevel output device for producing a bilevel output signal representative of the algebraic sign of said output signal derivative, both of said error signal and output signal derivatives thus having the same or different algebraic signs for finite values thereof for two complementary combinations of said bilevel output signals; polarity selector means for impressing a correction signal on said servo and utilization device, and a gating circuit responsive to at least one of said complementary combinations for impressing a control signal on said polarity selector means to change the polarity of the output signal thereof.

3. The invention as defined in claim 2, wherein said gating circuit is adapted to impress a control signal on said polarity selector means only on the occurrence of one of said complementary combinations, said polarity selector means being biased to impress said error signal on said servo and utilization device in a manner to cause correction of said output signal when the other of said complementary combinations occurs and also when said error signal is equal to zero.

4. In an automatic frequency control system including a reference signal source for producing a reference signal of a frequency $r$, an oscillator to be controlled and producing an output signal of a frequency $c$, a servo to tune the oscillator, and a mixer for producing at least an output signal of a frequency the quantity $e=|c-r|$; an arrangement for introducing a correction signal to said servo for reducing said frequency $e$ to zero, said arrangement comprising: means for producing a first signal proportional to $$\frac{de}{dt}$$

means for producing a second signal proportional to $$\frac{dc}{dt}$$

and means responsive to said first and second signals for turning said oscillator in a manner to decrease the oscillation frequency thereof when the algebraic signs of said first and second signals are alike and for tuning said oscillator in a manner to increase the oscillation frequency thereof when the algebraic signs of said first and second signals are different.

5. In an automatic frequency control system including a reference signal source for producing a reference signal of a frequency $r$, an oscillator to be controlled and producing an output signal of a frequency $c$, a servo to tune the oscillator, and a mixer for producing at least an output signal of a frequency the quantity $e=|c-r|$; an arrangement for introducing a correction signal to said servo for reducing said frequency $e$ to zero, said arrangement comprising: a filter at the output of said mixer to pass only A.C. signals of a frequency less than $r$; means responsive to the output of said filter for producing an error signal $e$ proportional to the quantity $|c-r|$; means for producing a control signal proportional to $c$; a first differentiator for producing an output signal proportional to the derivative of said error signal with respect to them; a first bilevel output device for producing bilevel signals corresponding to the algebraic sign of said error signal derivative; a second differentiator for producing a signal proportional to the derivative of said output signal; a second bilevel output device for producing a bilevel output signal representative of the algebraic sign of said output signal derivative, both of said error signal and output signal derivatives thus having the same or different algebraic signs for finite values thereof for two complementary combinations of said bilevel output signals; polarity selector means for impressing a correction signal on said servo and utilization device, and a gating circuit responsive to at least one of said polarity conditions for impressing a control signal on said polarity selector means to change the polarity of the output signal thereof.

6. An automatic frequency control system comprising: a reference signal source for producing a reference signal $r$; an oscillator to be controlled producing an output signal of a frequency $c$; a servo to tune the oscillator; a mixer responsive to said reference and output signals $r$ and $c$, respectively, for producing some end difference signals of frequencies $(c+r)$ and $(c-r)$, respectively; a filter at the output of said mixer to pass only A.C. signals of a frequency less than $r$; means responsive to the output of said filter for producing an error signal $e$ proportional to $|c-r|$; means for producing a control signal proportional to $c$; a first differentiator for producing a signal proportional to the $$\frac{de}{dt}$$

a first bilevel output device for producing a signal A when said error signal derivative is of one polarity and a signal $\overline{A}$ when said error signal derivative is of the opposite polarity; a second differentiator for producing a signal proportional to the $$\frac{dc}{dt}$$

a second bilevel output device for producing a signal B when said output signal derivative is of said one polarity and for producing a signal $\overline{B}$ when the polarity of said output signal derivative is opposite said one polarity; means for tuning said oscillator in a manner to reduce the oscillation frequency thereof when the following logical equation is true: $A.B+\overline{A}.\overline{B}$; and means for tuning said oscillator in a manner to increase the oscillation frequency thereof when the following logical equation is true: $A.\overline{B}+\overline{A}.B$.

7. In a follow-up system including a servo and utilization device producing an output signal $c$, and means for producing a reference signal $r$, the combination comprising: means for producing an error signal $e$ proportional to $|c-r|$; means for producing a signal $$\frac{de}{dt}$$

proportional to the rate of change of said error signal; means for producing a signal $$\frac{dc}{dt}$$

proportional to the rate of change of said output signal; and means for introducing one correction signal to said servo and utilization device when the algebraic signs of said $$\frac{de}{dt} \text{ and } \frac{dc}{dt}$$

signals are the same, and for introducing another correction signal to said servo and utilization device when the algebraic signs of said $$\frac{de}{dt} \text{ and } \frac{dc}{dt}$$

signals are different, said one correction signal tending to reduce said output signal $c$ and said other correction signal tending to increase said output signal $c$.

8. The invention as defined in claim 2, wherein said first bilevel output device includes first and second rectifier circuits connected from the output of said first differentiator for passing only positive and negative values of said error signal derivative, respectively, and a high gain amplifier responsive to the output of each of said first and second rectifier circuits for producing said bilevel signals; and wherein said second bilevel output device includes third and fourth rectifier circuits connected from said differentiator to pass only positive and negative output signals, respectively, and a high gain amplifier responsive to the output of each of said third and fourth rectifier circuits for producing said bilevel signals.

9. In a follow-up system including a servo and utilization device for producing an output signal, and means for producing a reference signal, the combination comprising: means for producing an error signal proportional to the absolute value of the difference between said output and reference signals; means for producing a first rate signal proportional to the rate of change of said error signal; means for producing a second rate signal proportional to the rate of change of said output signal; and means responsive to said error signal and said rate signals for introducing a correction signal to said servo and utilization device of an amplitude proportional to the amplitude of said error signal and of one polarity when the algebraic signs of said rate signals are the same and of an opposite polarity when the algebraic signs of said rate signals are different.

10. In a follow-up system including a servo and utilization device for producing an output signal, said servo being connected to said utilization device in a manner to reduce the output signal thereof on receipt of an input signal of one type greater than zero and in a manner to increase the output signal of said utilization device on receipt of an input signal of another type greater than zero, and means for producing a reference signal, the combination comprising: means for producing an error signal proportional to the difference between said output and reference signal; means for producing a first rate signal proportional to the rate of change of said error signal; means for producing a second rate signal proportional to the rate of change of said output signal; and means responsive to said error and said rate signals and for impressing an input signal having an amplitude proportional to said error signal of said one type when the algebraic signs of said rate signals are the same and for impressing an input signal having an amplitude proportional to said error signal of said other type when the algebraic signs of said rate signals are different.

11. In an automatic frequency control system including a source for producing an alternating signal, an oscillator for producing an alternating output signal, and a servo for decreasing the oscillation frequency of said oscillator on receipt of an input signal of one type greater than zero and for increasing the oscillation frequency of said oscillator on receipt of an input signal of another type greater than zero, the combination comprising: means for producing an error signal proportional to the difference between the frequencies of said output and reference signals; means for producing a first rate signal proportional to the rate of change of said error signal with respect to time; means for producing a second rate signal proportional to the rate of change of the frequency of said output signal with respect to time; and means responsive to said error and rate signals for impressing an input signal on said servo having a magnitude proportional to said error signal and of said one type when the algebraic signs of said rate signals are the same and for impressing an input signal on said servo having an amplitude proportional to said error signal and of said other type when the algebraic signs of said rate signals are different.

References Cited in the file of this patent

UNITED STATES PATENTS

| | | |
|---|---|---|
| 2,731,566 | Chalhoub | Jan. 17, 1956 |
| 2,774,872 | Howson | Dec. 18, 1956 |

UNITED STATES PATENT OFFICE

CERTIFICATE OF CORRECTION

Patent No. 2,892,945

June 30, 1959

Louis A. Ule

It is hereby certified that error appears in the printed specification of the above numbered patent requiring correction and that the said Letters Patent should read as corrected below.

Column 2, line 9, for "derivatives of" read -- derivatives are --; column 4, line 13, for "signa" read -- signal --; line 53, for "polarity in" read -- polarity and --; line 59, for "becomes" read -- become --; line 73, for "size" read -- sign --; column 5, line 10, for "is also" read -- are also --; column 6 line 73, for "them" read -- time --; column 7, line 41, for "turning" read -- tuning --; line 62, for "them" read -- time --; column 8, line 8, for "some end" read -- sum and --; column 9, line 31, for "signal" read -- signals --.

Signed and sealed this 1st day of December 1959.

(SEAL)
Attest:

KARL H. AXLINE
Attesting Officer

ROBERT C. WATSON
Commissioner of Patents